United States Patent
Lim et al.

(10) Patent No.: US 11,424,453 B2
(45) Date of Patent: Aug. 23, 2022

(54) RECHARGEABLE LITHIUM BATTERY

(71) Applicant: Samsung SDI Co., Ltd., Yongin-si (KR)

(72) Inventors: Jin-Hyeok Lim, Yongin-si (KR); Hyejin Park, Yongin-si (KR); Myungheui Woo, Yongin-si (KR); Hyunbong Choi, Yongin-si (KR); Harim Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 391 days.

(21) Appl. No.: 16/575,244

(22) Filed: Sep. 18, 2019

(65) Prior Publication Data

US 2021/0083295 A1    Mar. 18, 2021

(51) Int. Cl.
*H01M 4/62* (2006.01)
*H01M 4/36* (2006.01)
(Continued)

(52) U.S. Cl.
CPC .......... *H01M 4/628* (2013.01); *H01M 4/366* (2013.01); *H01M 4/661* (2013.01);
(Continued)

(58) Field of Classification Search
None
See application file for complete search history.

(56) References Cited

U.S. PATENT DOCUMENTS

| | | |
|---|---|---|
| 3,242,171 A | 3/1966 | Schmutzler |
| 2008/0118843 A1 | 5/2008 | Tarnopolsky |

(Continued)

FOREIGN PATENT DOCUMENTS

| | | |
|---|---|---|
| EP | 1926172 A1 | 5/2008 |
| EP | 2615680 A1 | 7/2013 |

(Continued)

OTHER PUBLICATIONS

Kim, Young-Soo et al.; Succinonitrile as Corrosion Inhibitor of Copper Current Collectors for Overdischarge Protection of Lithium Ion Batteries; ACS Appl. Mater. Interfaces; 2014; 6 (3); pp. 2039-2043.

(Continued)

*Primary Examiner* — Eli S Mekhlin
(74) *Attorney, Agent, or Firm* — Lewis Roca Rothgerber Christie LLP

(57) ABSTRACT

A rechargeable lithium battery includes a positive electrode, a negative electrode, and an electrolyte including a lithium salt, wherein at least one of the positive electrode and the negative electrode includes a current collector, an electrode tab extending from the current collector, an active material layer disposed on the current collector, and a passivation film formed on at least one of the current collector and the electrode tab. The passivation film includes a material represented by Chemical Formula 1:

$$CuX(POF_2)_nY_2Z, \qquad \text{Chemical Formula 1}$$

wherein, in Chemical Formula 1, X is a $C_1$ to $C_{10}$ alkylene group, Y is represented by Chemical Formula 2, Z is an anion group of the lithium salt, and n is 1 or 2:

$$NC-R^1-CN, \text{ (wherein, } R^1 \text{ is a } C_1 \text{ to } C_{10} \text{ alkylene group).} \qquad \text{Chemical Formula 2}$$

13 Claims, 9 Drawing Sheets

(51) Int. Cl.
    *H01M 10/0568*    (2010.01)
    *H01M 10/0567*    (2010.01)
    *H01M 10/0525*    (2010.01)
    *H01M 4/66*    (2006.01)
    *H01M 50/531*    (2021.01)

(52) U.S. Cl.
    CPC ... *H01M 10/0525* (2013.01); *H01M 10/0567* (2013.01); *H01M 10/0568* (2013.01); *H01M 50/531* (2021.01); *H01M 2300/0025* (2013.01)

(56) References Cited

U.S. PATENT DOCUMENTS

| | | |
|---|---|---|
| 2009/0291370 A1 | 11/2009 | Kim et al. |
| 2011/0236768 A1 | 9/2011 | Tani |
| 2012/0070708 A1 | 3/2012 | Ohira et al. |
| 2013/0177818 A1 | 7/2013 | Han et al. |
| 2014/0272604 A1 | 9/2014 | Lim et al. |
| 2015/0357678 A1 | 12/2015 | Tsubouchi |
| 2016/0056503 A1 | 2/2016 | Shatunov et al. |
| 2017/0331143 A1 | 11/2017 | Morinaka et al. |
| 2019/0252724 A1 | 8/2019 | Shatunov et al. |
| 2020/0052333 A1 | 2/2020 | Shatunov et al. |
| 2020/0052334 A1 | 2/2020 | Shatunov et al. |
| 2020/0052335 A1 | 2/2020 | Shatunov et al. |
| 2020/0052336 A1 | 2/2020 | Shatunov et al. |
| 2020/0052337 A1 | 2/2020 | Shatunov et al. |
| 2021/0005932 A1 | 1/2021 | Lim et al. |

FOREIGN PATENT DOCUMENTS

| | | |
|---|---|---|
| JP | WO2010/067549 A1 | 6/2010 |
| KR | 10-2009-0039211 A | 4/2009 |
| KR | 10-2009-0120961 A | 11/2009 |
| KR | 10-2012-0042758 A | 5/2012 |
| KR | 10-2014-0104383 A | 8/2014 |
| KR | 10-2015-0022653 A | 3/2015 |
| KR | 10-2015-0078690 A | 7/2015 |
| KR | 10-2015-0139780 A | 12/2015 |
| KR | 10-2016-0024414 A | 3/2016 |
| KR | 10-2018-0036340 A | 4/2018 |
| WO | WO 2016/088773 A1 | 6/2016 |

OTHER PUBLICATIONS

Korean Office action issued in corresponding application No. KR 10-2018-0046909, dated Jul. 1, 2020, 7 pages, with English Translation.
U.S. Office Action dated Aug. 6, 2020, issued in U.S. Appl. No. 16/655,123 (8 pages).
U.S. Office Action dated Sep. 1, 2020, issued in U.S. Appl. No. 16/655,118 (7 pages).
EPO Extended Search Report dated Jun. 30, 2020, for corresponding European Patent Application No. 17856605.5 (8 pages).
Bell, Graeme A. et al., "Instant Ligands. Part 1, Preparation of Some Bidentate Fluorophosphine Ligands Derived from Straight Chain Organic Substrates, and their Reactions to form Molybdenum Complexes", J. Chem. Soc. Dalton. Trans., 1986, vol. 8, pp. 1689-1692.
Reddy, G. S. et al., "Nuclear Magnetic Resonance Studies on Fluorides of Trivalent Phosphorus", Z. Naturforschg., 1965, vol. 20b, pp. 104-109.
U.S. Office Action dated May 14, 2020, issued in U.S. Appl. No. 16/335,240 (8 pages).
U.S. Notice of Allowance dated Sep. 30, 2020, issued in U.S. Appl. No. 16/335,240 (5 pages).
U.S. Office Action dated Oct. 7, 2020, issued in U.S. Appl. No. 16/655,126 (7 pages).
U.S. Office Action dated Nov. 12, 2020, issued in U.S. Appl. No. 16/655,130 (7 pages).
U.S. Office Action dated Nov. 12, 2020, issued in U.S. Appl. No. 16/655,136 (7 pages).
U.S. Notice of Allowance dated Dec. 16, 2020, issued in U.S. Appl. No. 16/655,123 (5 pages).
U.S. Notice of Allowance dated Feb. 17, 2021, issued in U.S. Appl. No. 16/655,118 (5 pages).
U.S. Notice of Allowance dated Feb. 24, 2021, issued in U.S. Appl. No. 16/655,126 (5 pages).
U.S. Notice of Allowance dated Mar. 31, 2021, issued in U.S. Appl. No. 16/655,136 (5 pages).
U.S. Notice of Allowance dated Apr. 1, 2021, issued in U.S. Appl. No. 16/655,130 (5 pages).
U.S. Office Action dated Nov. 5, 2021, issued in U.S. Appl. No. 17/023,272 (8 pages).
U.S. Notice of Allowance dated Feb. 22, 2022, for cross reference U.S. Appl. No. 17/023,272, (7 pages).

RECHARGEABLE LITHIUM BATTERY

BACKGROUND

1. Field

One or more aspects of example embodiments of the present disclosure are related to a rechargeable lithium battery.

2. Description of the Related Art

Portable information devices (such as cell phones, laptops, smart phones, and/or the like) and electric vehicles may use a rechargeable lithium battery having high energy density and easy portability as a driving power source.

In general, a rechargeable lithium battery uses materials capable of reversibly intercalating and deintercalating lithium ions as a positive active material and a negative active material; and the battery includes an electrolyte between the positive electrode and the negative electrode.

Lithium transition metal oxides are often used as the positive active material of the rechargeable lithium battery; various suitable types of carbon-based materials are often used as the negative active material, and lithium salts dissolved in a non-aqueous organic solvent are often used as an electrolyte.

The characteristics of a rechargeable lithium battery are related to complex reactions, such as those between the positive electrode (e.g., positive active material) and the electrolyte, or between the negative electrode (e.g., negative active material) and the electrolyte, and/or the like. Therefore, the use of a suitable electrolyte is an important parameter for improving the performance of a rechargeable lithium battery.

SUMMARY

One or more aspects of embodiments of the present disclosure are directed toward a rechargeable lithium battery having improved characteristics.

One or more example embodiments of the present disclosure provide a rechargeable lithium battery including a positive electrode, a negative electrode, and an electrolyte between the positive electrode and the negative electrode, the electrolyte including a lithium salt, wherein at least one electrode selected from the positive electrode and the negative electrode includes a current collector, an electrode tab extending from the current collector, an active material layer on the current collector, and a passivation film including a material represented by Chemical Formula 1 formed on at least one selected from the current collector and the electrode tab:

  Chemical Formula 1

In Chemical Formula 1,
X may be a $C_1$ to $C_{10}$ alkylene group,
Y may be represented by Chemical Formula 2:

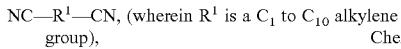  Chemical Formula 2

Z may be an anion group (e.g., counter anion) of the lithium salt, and
n is 1 or 2.

According to embodiments of the present disclosure, cycle-life characteristics and durability of a rechargeable lithium battery may be improved.

DETAILED DESCRIPTION

Figure 1:
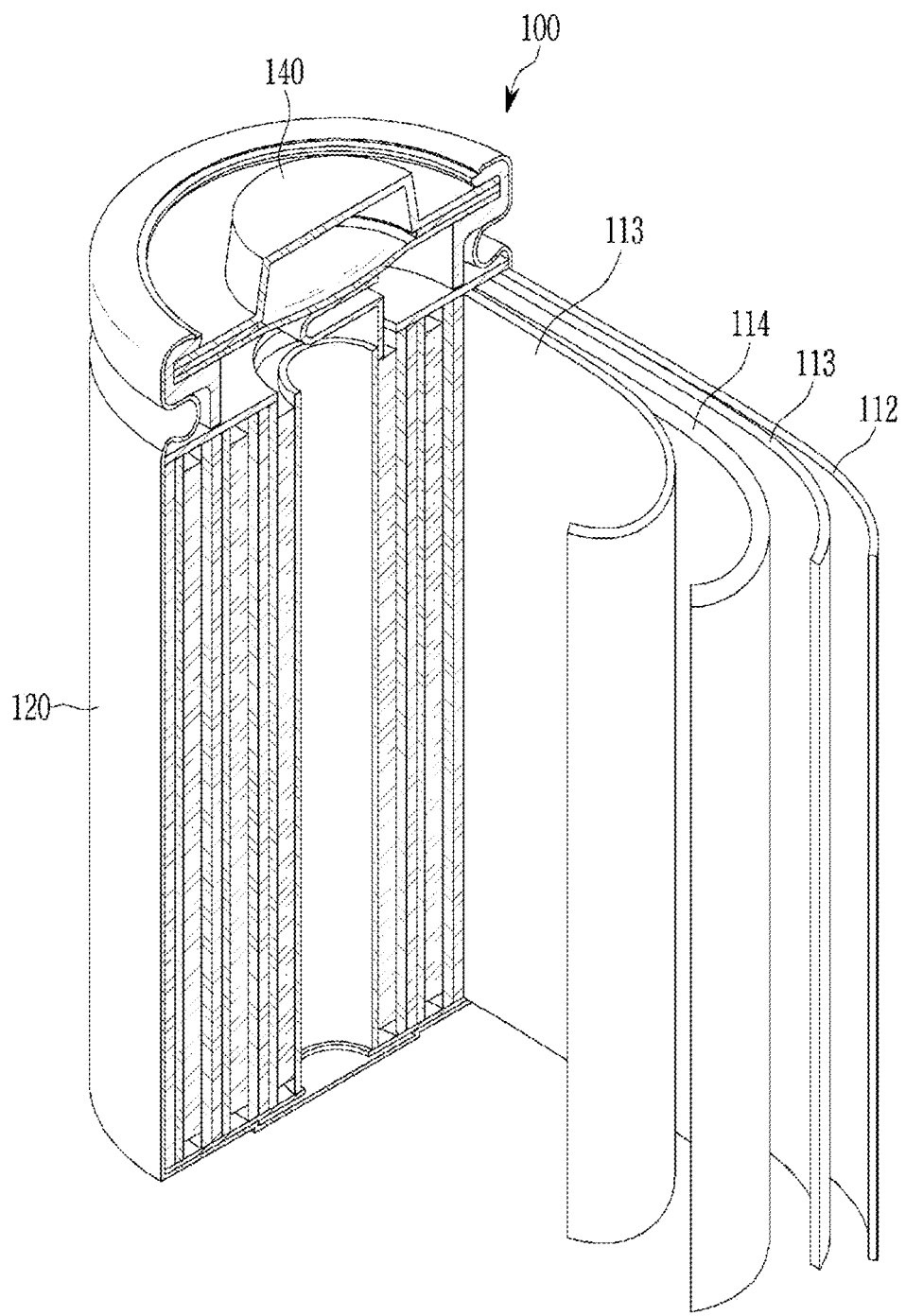
FIG. 1 is a schematic view of an example structure of a rechargeable lithium battery according to an embodiment of the present disclosure.

Hereinafter, example embodiments of the present invention are described in more detail with reference to the accompanying drawings, wherein like reference numerals refer to like elements throughout and duplicative descriptions thereof may not be provided. In the following description of the present disclosure, well-known functions or constructions known to those having ordinary skill in the art will not be described in order to clarify the present disclosure.

The thicknesses of layers, films, panels, regions, etc., may be exaggerated in the drawings for clarity, and accordingly, embodiments of the present disclosure are not necessarily limited to the dimensions shown in the drawings. It will be understood that when an element such as a layer, film, region, or substrate is referred to as being "on" another element, it can be directly on the other element or intervening element(s) may also be present. In contrast, when an element is referred to as being "directly on" another element, no intervening elements are present.

Expressions such as "at least one of", "one of", "selected from", "at least one selected from", and "one selected from", when preceding a list of elements, modify the entire list of elements and do not modify the individual elements of the list. Further, the use of "may" when describing embodiments of the present disclosure refers to "one or more embodiments of the present disclosure.

Hereinafter, a rechargeable lithium battery according to an embodiment of the present disclosure is described with reference to FIG. 1. FIG. 1 is a schematic view showing an example structure of a rechargeable lithium battery according to an embodiment of the present disclosure.

Referring to FIG. 1, a rechargeable lithium battery 100 according to an embodiment of the present disclosure includes a battery cell including a negative electrode 112, a positive electrode 114 facing the negative electrode 112, a separator 113 interposed between the negative electrode 112 and the positive electrode 114, an electrolyte for a rechargeable lithium battery impregnating the negative electrode 112, the positive electrode 114, and the separator 113, a battery case 120 configured to accommodate the battery cell, and a sealing member 140 sealing the battery case 120.

At least one of the positive electrode 114 and the negative electrode 112 includes a current collector, an electrode tab extending from the current collector, an active material layer disposed on the current collector, and a passivation film including a material represented by Chemical Formula 1 formed on at least one of the current collector and the electrode tab. For example, the positive electrode may include a positive current collector and a positive electrode tab extending from the positive current collector; the negative electrode may include a negative current collector and a negative electrode tab extending from the negative current collector, and the passivation film may be formed on (e.g., directly on) at least one selected from the positive current collector, the negative current collector, the positive electrode tab, and the negative electrode tab.

$$CuX(POF_2)_nY_2Z. \quad \text{Chemical Formula 1}$$

In Chemical Formula 1,
X is a $C_1$ to $C_{10}$ alkylene group,
Y is represented by Chemical Formula 2:

$$NC-R^1-CN, \text{ (wherein, } R^1 \text{ is a } C_1 \text{ to } C_{10} \text{ alkylene group),} \quad \text{Chemical Formula 2}$$

Z is an anion group of the lithium salt, and
n is 1 or 2.

The current collector and the electrode tab according to an embodiment of the present disclosure may include or be formed of copper (Cu) metal, and the current collector and the electrode tab may be include or be formed of the same material. In some embodiments, the current collector and the electrode tab may be integrally formed (e.g., as a continuous body). In some embodiments, the current collector and the electrode tab may be separately formed (e.g., of separate metal pieces) and then subsequently joined to form an electrical contact.

The electrolyte includes a lithium salt, which is dissolved in a solvent to act as a source of lithium ions in order to enable basic operation of the rechargeable lithium battery and to facilitate transportation of lithium ion between the positive electrode and the negative electrode.

Non-limiting examples of the lithium salt include $LiPF_6$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein x and y are each a natural number, for example, an integer ranging from 1 to 20), LiCl, LiI, $LiB(C_2O_4)_2$ (lithium bis(oxalato) borate, LiBOB), and combinations thereof.

A concentration of the lithium salt may be about 0.1 M to about 2.0 M. When the lithium salt is included in the above concentration range, the electrolyte may have excellent performance and/or lithium ion mobility due to desired electrolyte conductivity and viscosity.

In Chemical Formula 1, Z may be an anion group (e.g., counter anion) of a lithium ion, for example, an anion group dissociated (derived) from the lithium salt in the electrolyte. For example, when the lithium salt includes $LiPF_6$, Z may therefore be $PF_6^-$, but embodiments of the present disclosure are not limited thereto.

In some embodiments, the electrolyte may further include an organic solvent to dissolve the lithium salt. The organic solvent may be a non-aqueous organic solvent having a high ion conductivity, a high dielectric constant, and/or a low viscosity. The non-aqueous organic solvent serves as a medium for transporting ions taking part in the electrochemical reactions of a battery.

The non-aqueous organic solvent may be or include, for example, a carbonate-based solvent, an ester-based solvent, an ether-based solvent, a ketone-based solvent, an alcohol-based solvent, and/or an aprotic solvent.

The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and/or the like. The ester-based solvent may include methyl acetate, ethyl acetate, n-propyl acetate, t-butyl acetate, methyl propionate, ethyl propionate, propyl propionate, γ-butyrolactone, decanolide, valerolactone, mevalonolactone, caprolactone, and/or the like.

The ether-based solvent may include dibutyl ether, tetraglyme, diglyme, dimethoxyethane, 2-methyltetrahydrofuran, tetrahydrofuran, and/or the like, and the ketone-based solvent may include cyclohexanone, and/or the like.

The alcohol based solvent may include ethanol, isopropyl alcohol, and/or the like, and the aprotic solvent may include nitriles (such as T-CN, wherein T is a $C_2$ to $C_{20}$ linear, branched, and/or cyclic hydrocarbon group including a double bond, an aromatic ring, and/or an ether bond), and/or the like, amides (such as dimethyl formamide and/or the like), dioxolanes (such as 1,3-dioxolane and/or the like), sulfolanes, and/or the like.

The non-aqueous organic solvent may be used alone or in a mixture (e.g., the organic solvent may be a single solvent or a mixture of solvents). When the organic solvent is used in a mixture, the mixture ratio (e.g., relative amounts of solvents) may be controlled or selected in accordance with desirable battery performance.

The carbonate-based solvent may be prepared by mixing a cyclic carbonate and a chain-type (e.g., linear) carbonate. In some embodiments, the cyclic carbonate and the chain-type carbonate may be mixed in a volume ratio of about 1:1 to about 1:9, and electrolyte performance may be enhanced.

The non-aqueous organic solvent may further include an aromatic hydrocarbon-based organic solvent in addition to the carbonate-based solvent. In some embodiments, the carbonate-based solvent and the aromatic hydrocarbon-based organic solvent may be mixed in a volume ratio of about 1:1 to about 30:1.

The aromatic hydrocarbon-based organic solvent may be an aromatic hydrocarbon-based compound represented by Chemical Formula 5:

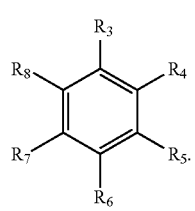

Chemical Formula 5

In Chemical Formula 5, $R_3$ to $R_8$ may be the same or different, and are selected from hydrogen, a halogen, a $C_1$ to $C_{10}$ alkyl group, a haloalkyl group, and combinations thereof.

Non-limiting examples of the aromatic hydrocarbon-based organic solvent include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and combinations thereof.

In a rechargeable lithium battery including a non-aqueous organic solvent, irreversible side reactions may occur between the electrolyte and the negative electrode, and between the electrolyte and the positive electrode at high temperatures and/or high pressures. The decomposition products produced by such side reactions may form a thick passivation film, which may increase resistance on the surface of the electrode, thereby lowering a cycle life and capacity of the rechargeable lithium battery. In addition, decomposition of the non-aqueous organic solvent may generate gas inside the battery, causing swelling that may lead to battery rupture or explosion.

However, when the passivation film according to embodiments of the present disclosure is formed on at least one of the current collector and the electrode tab exposed to the electrolyte, the irreversible side reactions between the electrolyte and the positive electrode may be controlled or reduced, and decomposition of the electrolyte and the negative electrode at high temperature and high pressure may be prevented or reduced.

In some embodiments, the film may be formed on the current collector and electrode tab through a separate process (e.g., a deposition process during manufacture and prior to sealing of the battery), and in some embodiments, may be formed via decomposition products generated by the above-described side reactions. For example, the current collector and the electrode tab may include a copper (Cu) metal, and the copper component in the material represented by Chemical Formula 1 in the passivation film may be derived from the current collector and the electrode tab.

The passivation film according to an embodiment of the present disclosure may be formed in an appropriate or suitable thickness to prevent or reduce additional side reactions without undesirably increasing the electrical resistance on the surface of the electrode. For example, the passivation film may be formed with a thickness of about 25 μm to about 50 μm. When the passivation film is formed with the thickness of the range, additional side reactions may be avoided without increasing the electrical resistance on the surface of the electrode.

The electrolyte according to embodiments of the present disclosure may further include an additive for forming the passivation film that may prevent or reduce additional side reactions without undesirably increasing the electrical resistance of the surface of the electrode.

The additive according to an embodiment of the present disclosure may include a compound represented by Chemical Formula 3 and/or Chemical Formula 4:

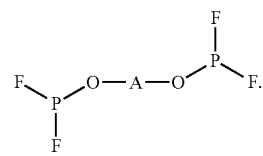

Chemical Formula 3

In Chemical Formula 3,

A is a $C_1$ to $C_{10}$ alkylene group (such as methylene, ethylene, propylene, butylene, pentylene, hexylene, heptylene, octylene, nonylene, or decylene), a $C_2$ to $C_{10}$ ether group including one or more of a methylene, ethylene, propylene, butylene, pentylene, hexylene, heptylene, octylene, or nonylene subgroup, or $(-C_2H_4-O-C_2H_4-)_m$ (wherein m is an integer of 1 to 10).

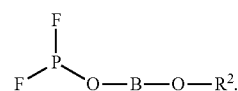

Chemical Formula 4

In Chemical Formula 4,

B is a $C_1$ to $C_{10}$ alkylene group (such as methylene, ethylene, propylene, butylene, pentylene ether group including one or more of a methylene, ethylene, propylene, butylene, pentylene, hexylene, heptylene, octylene, or nonylene subgroup, hexylene, heptylene, octylene, nonylene, or decylene), a $C_1$ to $C_{10}$ ether group including one or more of a methylene, ethylene, propylene, butylene, pentylene, hexylene, heptylene, octylene, or nonylene subgroup, or $(-C_2H_4-O-C_2H_4-)_l$ (wherein l is an integer of 1 to 10), and $R^2$ is a $C_1$ to $C_{10}$ alkyl group (such as methyl, ethyl, propyl, butyl, pentyl, hexyl, heptyl, octyl, nonyl, or decyl).

For example, in Chemical Formula 3 and Chemical Formula 4, A and B may each independently be a $C_1$ to $C_5$ alkylene group, and m and l may independently be an integer of 1 to 5.

The compound represented by Chemical Formula 3 and/or Chemical Formula 4 includes a difluorophosphite ($-OPF_2$) group having excellent electrochemical reactivity at the terminal ends.

During the initial charge (e.g., formation) of the rechargeable lithium battery, lithium ions from a lithium-transition metal oxide electrode (which is a positive active material-containing electrode) are transferred to a carbon electrode (which is a negative active material-containing electrode), and are intercalated into carbon. Herein, lithium ions may react with the carbon electrode (for example, with electrolyte at or near the carbon electrode) due to its strong reactivity to produce $Li_2CO_3$, $Li_2O$, $LiO_2$, LiOH, and/or the like to form a passivation film on the surface of the negative electrode. This passivation film is called a solid electrolyte interface (interphase) (SEI) film. In some embodiments, the passivation film according to embodiments of the present disclosure may be at least a part of the aforementioned SEI film, and for example, may be on (directly on) the current collector and/or the electrode tab, and in some embodiments, only on the current collector and/or the electrode tab.

The SEI film formed during the initial charge may prevent or reduce the reactions between lithium ions and the carbon negative electrode or other materials during subsequent charge and discharge cycles. In addition, the SEI may include structures that act as ion tunnels, allowing the passage (e.g., selective passage) of lithium ions. The ion tunnels may prevent or reduce disintegration of the structure of the carbon negative electrode caused by co-intercalation of organic solvents having a high molecular weight, along with solvated lithium ions, into the carbon negative electrode. Once the SEI film is formed, lithium ions do not react again with the carbon electrode or other materials, such that the amount of lithium ions is maintained. Therefore, in order to improve the high-temperature cycle characteristics and/or the low-temperature output of the rechargeable lithium battery, a rigid SEI film may be formed on the negative electrode of the rechargeable lithium battery.

When the additive including the compound represented by Chemical Formula 3 and/or Chemical Formula 4 is included in the electrolyte for a rechargeable lithium battery according to embodiments of the present disclosure, a rigid SEI film having improved ion conductivity is formed on the surface of the negative electrode, and it is thereby possible to suppress or reduce electrolyte decomposition on the surface of the negative electrode during high temperature cycle operation, and to prevent or reduce oxidation reactions of the electrolyte.

The compound represented by Chemical Formula 3 and/or Chemical Formula 4 may be decomposed to form a difluorophosphite ($-OPF_2$) group and an alkylene dioxide fragment. For example, the alkylene dioxide fragment may be an ethylene dioxide fragment.

The difluorophosphite ($-OPF_2$) group may form a donor-acceptor bond with a transition metal oxide moiety that is exposed on the surface of the positive active material due to excellent electrochemical reactivity, thereby forming a protective layer in a form of a composite.

In addition, the difluorophosphite ($-OPF_2$) group adhered to the transition metal oxide on initial charge of the rechargeable lithium battery may be oxidized to a plurality of fluorophosphite groups, and thus a passivation film including a more stable inactive layer having excellent ion conductivity may be formed on the positive electrode. The passivation film may thus prevent or reduce other components of the electrolyte from being oxidatively decomposed, and as a result, the cycle-life performance of the rechargeable lithium battery may be improved and swelling may be prevented or reduced.

In some embodiments, the compound represented by Chemical Formula 3 and/or Chemical Formula 4 and its oxide may further participate in the electrochemical reaction with the components of the SEI film to make the SEI film more rigid and to improve the stability of other components included in the electrolyte against oxidative decomposition.

In some embodiments, the compound represented by Chemical Formula 3 and/or Chemical Formula 4 may form a composite with $LiPF_6$ to form a passivation film, and undesirable side reactions may thus be prevented or reduced, thereby improving the cycle-life characteristics of the rechargeable lithium battery and preventing or reducing generation of gas in the rechargeable lithium battery, thereby greatly reducing the rate of defects due to battery swelling.

The additive including the compound represented by Chemical Formula 3 and/or Chemical Formula 4 may be included in an amount of about 0.1 wt % to about 10 wt % based on a total weight of the electrolyte for a rechargeable lithium battery. In some embodiments, the amount of the compound represented by Chemical Formula 3 may be about 0.1 wt % to about 5 wt %, or about 0.1 wt % to about 1 wt %. When the amount of the additive satisfies the above ranges, a resistance increase may be prevented or reduced, and thus a rechargeable lithium battery having improved cycle-life characteristics may be realized.

In some embodiments, for example, the additive may include a compound represented by Chemical Formula 3-1 and/or Chemical Formula 4-1:

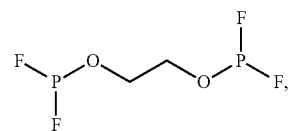

Chemical Formula 3-1

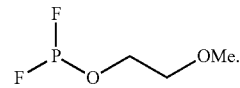

Chemical Formula 4-1

However, this is a single example, and it will be understood that it is possible to include other additives according to numerous exemplary variations.

In some embodiments, for example, the additive may include a nitrile-based compound. For example, the nitrile-based compound may include succinonitrile, adiponitrile, glutaronitrile, a tri-cyanide compound, or a combination thereof. As used herein, the term "tri-cyanide compound" refers to a compound having three cyano (nitrile) functional groups. In some embodiments, the tri-cyanide compound may be an alkyl group. Non-limiting examples of a tri-cyanide compound include 1,3,6-hexane tri-cyanide (HTCN) and 1,2,6-hexane tri-cyanide (HTCN). When the passivation film includes a nitrile component, it may easily form a passivation film complex by co-relating (e.g., cross-coupling) with the compound represented by Chemical Formula 3-1 and/or Chemical Formula 4-1, thereby preventing or reducing further dissolution of Cu.

An active material layer is formed on the aforementioned current collector. According to an embodiment of the present disclosure, a positive electrode 114 and a negative electrode 112 each include an active material layer, and the structure of each active material layer may have the same outer shape. However, because the positive electrode 114 and the negative electrode 112 have different functions and effects, the active material layer formed in each of the positive electrode 114 and the negative electrode 112 may include materials different from each other. Herein, the active material layer formed on the positive electrode 114 is defined as a positive active material layer, and the active material layer formed on the negative electrode 112 is defined as a negative active material layer.

In the positive active material layer, the positive active material may include a compound (lithiated intercalation compound) capable of intercalating and deintercalating lithium, and for example, at least one composite oxide including lithium and a metal selected from cobalt, manganese, nickel, and combinations thereof may be used. Non-limiting examples thereof include compounds represented by one or more of the following chemical formulae. $Li_aA_{1-b}X_bD_2$ ($0.90 \le a \le 1.8$, $0 \le b \le 0.5$); $Li_aA_{1-b}X_bO_{2-c}D_c$ ($0.90 \le a \le 1.8$, $0 \le b \le 0.5$, $0 \le c \le 0.05$); $Li_aE_{1-b}X_bO_{2-c}D_c$ ($0.90 \le a \le 1.8$, $0 \le b \le 0.5$, $0 \le c \le 0.05$); $Li_aE_{2-b}X_bO_{4-c}D_c$ ($0.90 \le a \le 1.8$, $0 \le b \le 0.5$, $0 \le c \le 0.05$); $Li_aNi_{1-b-c}Co_bX_cD_\alpha$ ($0.90 \le a \le 1.8$, $0 \le b \le 0.5$, $0 \le c \le 0.5$, $0 \le \alpha \le 2$); $Li_aNi_{1-b-c}Co_bX_cO_{2-\alpha}T_\alpha$ ($0.90 \le a \le 1.8$, $0 \le b \le 0.5$, $0 \le c \le 0.05$, $0 < \alpha < 2$); $Li_aNi_{1-b-c}Co_bX_cO_{2-\alpha}T_2$ ($0.90 \le a \le 1.8$, $0 \le b \le 0.5$, $0 \le c \le 0.05$, $0 < \alpha < 2$); $Li_aNi_{1-b-c}Mn_bX_cD_\alpha$ ($0.90 \le a \le 1.8$, $0 \le b \le 0.5$, $0 \le c \le 0.05$, $0 < \alpha \le 2$); $Li_aNi_{1-b-c}Mn_bX_cO_{2-\alpha}T_\alpha$ ($0.90 \le a \le 1.8$, $0 \leq b \leq 0.5$, $0 \leq c \leq 0.05$, $0 < \alpha < 2$); $Li_aNi_{1-b-c}Mn_bX_cO_{2-\alpha}T_2$ ($0.90 \leq a \leq 1.8$, $0 \leq b \leq 0.5$, $0 \leq c \leq 0.05$, $0 < \alpha < 2$); $Li_aNi_bE_cG_dO_2$ ($0.90 \leq a \leq 1.8$, $0 \leq b \leq 0.9$, $0 \leq c \leq 0.5$, $0.001 \leq d \leq 0.1$); $Li_aNi_bCo_cMn_dG_eO_2$ ($0.90 \leq a \leq 1.8$, $0 \leq b \leq 0.9$, $0 \leq c \leq 0.5$, $0 \leq d \leq 0.5$, $0.001 \leq e \leq 0.1$); $Li_aNiG_bO_2$ ($0.90 \leq a \leq 1.8$, $0.001 \leq b \leq 0.1$); $Li_aCoG_bO_2$ ($0.90 \leq a \leq 1.8$, $0.001 \leq b \leq 0.1$); $Li_aMn_{1-b}G_bO_2$ ($0.90 \leq a \leq 1.8$, $0.001 \leq b \leq 0.1$); $Li_aMn_2G_bO_4$ ($0.90 \leq a \leq 1.8$, $0.001 \leq b \leq 0.1$); $Li_aMn_{1-g}G_gPO_4$ ($0.90 \leq a \leq 1.8$, $0 \leq g \leq 0.5$); $QO_2$; $QS_2$; $LiQS_2$; $V_2O_5$; $LiV_2O_5$; $LiZO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $Li_aFePO_4$ ($0.90 \leq a \leq 1.8$)

In the above chemical formulae, A is selected from nickel (Ni), cobalt (Co), manganese (Mn), and combinations thereof; X is selected from aluminum (Al), Ni, Co, Mn, chromium (Cr), iron (Fe), magnesium (Mg), strontium (Sr), vanadium (V), a rare earth element, and combinations thereof; D is selected from oxygen (O), fluorine (F), sulfur (S), phosphorus (P), and combinations thereof; E is selected from Co, Mn, and combinations thereof; T is selected from F, S, P, and combinations thereof; G is selected from Al, Cr, Mn, Fe, Mg, lanthanum (La), cerium (Ce), Sr, V, and combinations thereof; Q is selected from titanium (Ti), molybdenum (Mo), Mn, and combinations thereof; Z is selected from Cr, V, Fe, scandium (Sc), yttrium (Y), and combinations thereof; and J is selected from V, Cr, Mn, Co, Ni, copper (Cu), and combinations thereof.

In some embodiments, the lithium metal oxide may include a coating layer on the surface (e.g., on the surface of the active material layer, and/or on a surface of a portion of the lithium metal oxide particles, for example, on a surface of one or more lithium metal oxide particles positioned at the top or outside surface of the active material layer of the electrode), or may be mixed with another lithium metal oxide having such a coating layer. The coating layer may include at least one coating element compound selected from an oxide of the coating element, a hydroxide of the coating element, an oxyhydroxide of the coating element, an oxycarbonate of the coating element, and a hydroxy carbonate of the coating element.

The compound for the coating layer may be amorphous or crystalline. The coating element included in the coating layer may include Mg, Al, Co, potassium (K), sodium (Na), calcium (Ca), silicon (Si), Ti, V, tin (Sn), germanium (Ge), gallium (Ga), boron (B), arsenic (As), zirconium (Zr), or a mixture thereof. The coating layer may be disposed using any suitable method having no or limited adverse influence on properties of a positive active material. For example, the method may include any coating method (e.g., spray coating, dipping, etc.), available in the related art.

In the positive electrode, the positive active material may be included in an amount of about 90 wt % to about 98 wt % based on a total weight of the positive active material layer.

In an embodiment, the positive active material layer may further include a binder and a conductive material. Herein, the content of each of the binder and the conductive material may be about 1 wt % to about 5 wt % based on a total weight of the positive active material layer.

The binder improves binding properties of positive active material particles with one another and with a current collector. Non-limiting examples thereof include polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but embodiments of the present disclosure are not limited thereto.

The conductive material is included to provide electrode conductivity, and any electrically conductive material may be used as the conductive material unless it causes an unwanted chemical change. Non-limiting examples of the conductive material include a carbon-based material (such as natural graphite, artificial graphite, carbon black, acetylene black, ketjen black, carbon fiber, and/or the like); a metal-based material (such as a metal powder and/or a metal fiber including copper, nickel, aluminum, silver, and/or the like); a conductive polymer (such as a polyphenylene derivative); and mixtures thereof.

The negative active material may include a material that reversibly intercalates/deintercalates lithium ions, a lithium metal, a lithium metal alloy, a material capable of doping/dedoping lithium, and/or a transition metal oxide.

The material that reversibly intercalates/deintercalates lithium ions may include a carbon material that is a generally-used carbon-based negative active material in a rechargeable lithium battery. Non-limiting examples of the carbon-based negative active material include crystalline carbon, amorphous carbon, and mixtures thereof. The crystalline carbon may be non-shaped (e.g., may not have any set or particular shape), or may be sheet, flake, spherical, or fiber shaped natural graphite or artificial graphite. The amorphous carbon may be a soft carbon, a hard carbon, a mesophase pitch carbonization product, fired coke, and/or the like.

The lithium metal alloy may include an alloy including lithium and a metal selected from Na, K, rubidium (Rb), cesium (Cs), francium (Fr), beryllium (Be), Mg, calcium (Ca), strontium (Sr), Si, antimony (Sb), lead (Pb), indium (In), zinc (Zn), barium (Ba), radium (Ra), Ge, Al, and Sn.

The material capable of doping/dedoping lithium may be Si, $SiO_x$ ($0 < x < 2$), a Si-Q alloy (wherein Q is an element selected from an alkali metal, an alkaline earth metal, a Group 13 element, a Group 14 element excluding Si, a Group 15 element, a Group 16 element, a transition metal, a rare earth element, and combinations thereof), a Si-carbon composite, Sn, $SnO_2$, a Sn—R alloy (wherein R is an element selected from an alkali metal, an alkaline-earth metal, a Group 13 element, a Group 14 element excluding Sn, a Group 15 element, a Group 16 element, a transition metal, a rare earth element, and combinations thereof), a Sn-carbon composite, and/or the like. At least one of these materials may be mixed with $SiO_2$. The elements Q and R may be selected from Mg, Ca, Sr, Ba, Ra, Sc, Y, Ti, Zr, hafnium (Hf), rutherfordium (Rf), V, niobium (Nb), tantalum (Ta), dubnium (Db), Cr, Mo, tungsten (W), seaborgium (Sg), technetium (Tc), rhenium (Re), bohrium (Bh), Fe, Pb, ruthenium (Ru), osmium (Os), hassium (Hs), rhodium (Rh), iridium (Ir), palladium (Pd), platinum (Pt), Cu, silver (Ag), gold (Au), Zn, Cd, B, Al, Ga, Sn, In, Ge, P, As, Sb, bismuth (Bi), S, selenium (Se), tellurium (Te), polonium (Po), and combinations thereof.

In some embodiments, the transition metal oxide includes a lithium titanium oxide (LTO).

The negative active material layer includes a negative active material, a binder, and optionally, a conductive material.

In the negative active material layer, the negative active material may be included in an amount of about 95 wt % to about 99 wt % based on a total weight of the negative active material layer. In the negative active material layer, a content of the binder may be about 1 wt % to about 5 wt % based on a total weight of the negative active material layer. When the conductive material is further included, about 90 wt % to about 98 wt % of the negative active material, about 1 wt % to about 5 wt % of the binder, and about 1 wt % to about 5 wt % of the conductive material may be used.

The binder acts to adhere negative active material particles to each other and to adhere the negative active material to the current collector. The binder may be a non-aqueous binder, an aqueous binder, or a combination thereof.

The non-aqueous binder may be polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

The aqueous binder may be a styrene-butadiene rubber, an acrylated styrene-butadiene rubber, polyvinyl alcohol, sodium polyacrylate, a copolymer of propylene and a $C_2$ to $C_8$ olefin, a copolymer of (meth)acrylic acid and (meth) acrylic acid alkyl ester, or a combination thereof.

When the negative electrode binder is an aqueous binder, a cellulose-based compound may be further included as a thickener to provide viscosity. The cellulose-based compound may include one or more of carboxylmethyl cellulose, hydroxypropylmethyl cellulose, methyl cellulose, and alkali metal salts thereof. The alkali metal may include Na, K, and/or Li. The thickener may be included in an amount of about 0.1 to about 3 parts by weight based on 100 parts by weight of the negative active material.

The conductive material is included to provide electrode conductivity, and any electrically conductive material may be used as a conductive material unless it causes an unwanted chemical change. Non-limiting examples of the conductive material include a carbon-based material (such as natural graphite, artificial graphite, carbon black, acetylene black, ketjen black, denka black, a carbon fiber, and/or the like); a metal-based material (such as a metal powder and/or a metal fiber including copper, nickel, aluminum, silver, and/or the like); a conductive polymer (such as a polyphenylene derivative); and mixtures thereof.

The positive active material layer and the negative active material layer may each be formed by mixing an active material, a binder, and optionally a conductive material in a solvent to prepare an active material composition, and coating the active material composition on a current collector. Suitable electrode formation methods are well known, and are thus not described in detail in the present disclosure. The solvent may include N-methylpyrrolidone and/or the like, but embodiments of the present disclosure are not limited thereto. When the aqueous binder is used in the negative active material layer, a solvent used for preparing the negative active material composition may be water.

Meanwhile, the electrolyte for a rechargeable lithium battery of the present disclosure may further include an additional (second) additive in addition to the additive (first additive) described above. The additional additive may be, for example, fluoroethylene carbonate, vinylene carbonate, hexane tricyanide, lithium tetrafluoroborate, propane sultone, or a combination thereof, but embodiments of the present disclosure are not limited thereto.

Herein, a content of the additional additive may be about 0.1 wt % to about 20 wt % based on a total weight of the electrolyte for the rechargeable lithium battery. More specifically, the content of the additional additive may be about 0.1 wt % to about 15 wt %. When the content of the additional additive satisfies the ranges, battery resistance may be suppressed more effectively and a rechargeable lithium battery with improved cycle-life characteristics may be realized.

Meanwhile, as described above, the separator 113 may be disposed between the positive electrode 114 and the negative electrode 112. The separator 113 may include polyethylene, polypropylene, polyvinylidene fluoride, or a multi-layer structure thereof, and may be a mixed multilayer (such as a polyethylene/polypropylene double-layered separator, a polyethylene/polypropylene/polyethylene triple-layered separator, a polypropylene/polyethylene/polypropylene triple-layered separator, and/or the like).

A method of manufacturing a rechargeable lithium battery according to another embodiment of the present disclosure includes:

putting an electrode assembly into a battery case, for example, assembling an electrode assembly including a positive electrode including a positive current collector, a positive electrode tab extending from the positive current collector, and an active material layer disposed on the positive current collector; and a negative electrode including a negative current collector, a negative electrode tab extending from the negative current collector, and a negative active material layer disposed on the negative current collector, by stacking the positive electrode and the negative electrode with a separator therebetween, placing the electrode assembly and an electrolyte including a lithium salt into a battery case so that the electrolyte penetrates the electrode assembly, sealing the battery case to manufacture a battery cell, and initially charging the battery cell at a low rate of about 0.05 C to about 0.2 C for about 5 hours to about 10 hours, thus forming a passivation film including a material represented by Chemical Formula 1 on (directly on) at least one selected from the positive current collector, the negative current collector, the positive electrode tab, and the negative electrode tab:

                              Chemical Formula 1

In Chemical Formula 1,

X is a $C_1$ to $C_{10}$ alkylene group,

Y is represented by Chemical Formula 2:

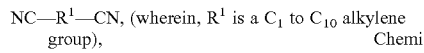
                                                            Chemical Formula 2

Z is an anion group of the lithium salt, and n is 1 or 2.

The passivation film according to embodiments of the present disclosure is formed on (directly on) at least one of the current collector and the electrode tab exposed to the electrolyte, and thus an irreversible side reaction between the electrolyte and the positive electrode may be limited, and degradation of the electrolyte at the negative electrode at high temperature and high pressure may be prevented or reduced.

The passivation film may be formed on the current collector and/or the electrode tab by performing the low-rate charge described above.

The passivation film according to an embodiment of the present disclosure may be formed in an appropriate or suitable thickness to prevent or reduce additional side reactions without increasing the electrical resistance on the surface of the electrode. For example, the passivation film may be formed with a thickness of about 25 μm to about 50 μm. When the passivation film is formed with the thickness of the range, additional side reactions may be avoided or reduced without undesirably increasing the electrical resistance on the surface of the electrode.

As described above, an electrolyte according to embodiments of the present disclosure may include a compound represented by Chemical Formula 3 and/or Chemical Formula 4 as an additive in order to form a passivation film that may prevent or reduce additional side reactions without increasing the electrical resistance of the surface of the electrode.

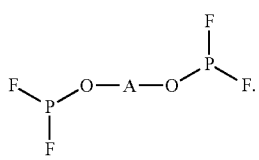

Chemical Formula 3

In Chemical Formula 3,

A is a $C_1$ to $C_{10}$ alkylene group, a $C_2$ to $C_{10}$ ether group, or (—$C_2H_4$—O—$C_2H_4$—)$_m$ (wherein m is an integer of 1 to 10).

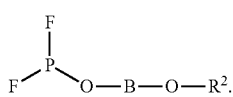

Chemical Formula 4

In Chemical Formula 4,

B is a $C_1$ to $C_{10}$ alkylene group, a $C_1$ to $C_{10}$ alkylene group, or (—$C_2H_4$—O—$C_2H_4$—)$_l$ (wherein l is an integer of 1 to 10), and $R^2$ is a $C_1$ to $C_{10}$ alkyl group.

For example, in Chemical Formula 3 and Chemical Formula 4, A and B may each independently be a $C_1$ to $C_5$ alkylene group, and m and l may independently be an integer of 1 to 5.

The compound represented by Chemical Formula 3 and/or Chemical Formula 4 includes a difluorophosphite (—$OPF_2$) group having excellent electrochemical reactivity at the terminal ends.

During the initial charge (e.g., formation) of the rechargeable lithium battery, lithium ions from a lithium-transition metal oxide electrode (which is a positive active material-containing electrode) are transferred to a carbon electrode (which is a negative active material-containing electrode), and are intercalated into carbon. Herein, lithium ions may react with the carbon electrode (and/or with electrolyte at the carbon electrode) due to its strong reactivity to produce $Li_2CO_3$, $Li_2O$, $LiO_2$, LiOH, and/or the like to form a passivation film on the surface of the negative electrode. This passivation film is called a solid electrolyte interface (interphase) (SEI) film. In some embodiments, the passivation film according to embodiments of the present disclosure may be at least a part of the aforementioned SEI film, and for example, may be on (directly on) the current collector and/or the electrode tab, and in some embodiments, only on the current collector and/or the electrode tab.

In some embodiments, the additive may include a nitrile-based compound. For example, the nitrile-based compound may include succinonitrile, adiponitrile, glutaronitrile, a tri-cyanide compound, or a combination thereof. The tri-cyanide compound may be the same as described above. When the passivation film includes a nitrile component, it may easily form a passivation film complex by co-relating (e.g., cross-coupling) with the compound represented by Chemical Formula 3-1 and/or Chemical Formula 4-1, thereby preventing or reducing further dissolution of Cu.

In some embodiments, at least one rechargeable lithium battery according to an embodiment of the present disclosure may be included in a device. Non-limiting example devices may include a mobile phone, a tablet computer, a laptop computer, a power tool, a wearable electronic device, an electric vehicle, a hybrid electric vehicle, a plug-in hybrid electric vehicle, and a power storage device. Such devices are well known in the related art and thus will not be described in more detail.

Hereinafter, the aforementioned aspects of the present disclosure are illustrated in more detail with reference to examples. However, these examples are exemplary, and the present disclosure is not limited thereto.

Manufacture of Rechargeable Lithium Battery Cell

Comparative Example 1: Cu in 1.5M $LiPF_6$ EC/EMC/DMC=2/2/6

A positive active material slurry was prepared using $LiNi_{0.8}Co_{0.15}Al_{0.05}O_2$ as a positive active material, polyvinylidene fluoride as a binder, and ketjen black as a conductive material in a weight ratio of 97.3:1.4:1.3 and dispersing the mixture in N-methyl pyrrolidone.

The positive active material slurry was coated on a 15 μm-thick Al foil, dried at 100° C., and pressed to manufacture a positive electrode.

A negative active material slurry was prepared by mixing graphite as a negative active material, polyvinylidene fluoride as a binder, and ketjen black as a conductive material in a weight ratio of 98:1:1 and then, dispersing the mixture in N-methyl pyrrolidone.

The negative active material slurry was coated on a 10 μm-thick Cu foil, dried at 100° C., and pressed to manufacture a negative electrode.

The positive and negative electrodes, a 25 μm-thick polyethylene separator, and an electrolyte were used to manufacture a rechargeable lithium battery cell.

Composition of Electrolyte

Salt: 1.5M $LiPF_6$

Solvent: EC/EMC/DMC=volume ratio of 2:2:6

Example 1

A rechargeable lithium battery cell was manufactured according to substantially the same method as Comparative Example 1, except that a compound represented by Chemical Formula 3-1 was added to the electrolyte as an additive.

Composition of Electrolyte

Salt: 1.5M $LiPF_6$

Solvent: EC/EMC/DMC=volume ratio of 2:2:6

Additive: 1 wt % of the compound represented by Chemical Formula 3-1:

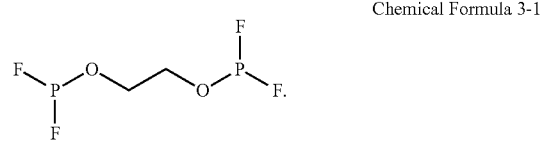

Chemical Formula 3-1

Herein, in the electrolyte composition, "wt %" is based on a total weight of an electrolyte (a lithium salt+a solvent+an additive).

Example 2

A rechargeable lithium battery cell was manufactured according to substantially the same method as Example 1, except that a compound represented by Chemical Formula 4-1 was added instead of the compound represented by Chemical Formula 3-1:

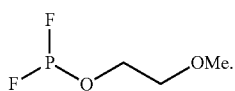

Chemical Formula 4-1

Example 3

A rechargeable lithium battery cell was manufactured according to substantially the same method as Example 1 except that a composition of the additive was changed as follows.

Additive: 1 wt % of the compound represented by Chemical Formula 3-1 and 1 wt % of succinonitrile.

Evaluation Examples

Evaluation of DC (Direct Current)-Internal Resistance after Cycle Repetition

The rechargeable lithium battery cells according to Example 1 and Comparative Example 1 were set to have residual capacity (SOC) of 100%, charged at 0.5 C under a cut-off condition of 4.2 V/0.05 C, and discharged at 1 C under a cut-off condition of 2.5 V. The charge and discharge process was repeated over 250 cycles, after which the DC-internal resistance of each cell was measured, and the results are shown in Table 1.

The DC-internal resistance (DC-IR) was calculated by applying various currents to the cells and obtaining a series of current differences and voltage differences.

In a full charge state, the cells were constant current-discharged at 10 A for 10 seconds.

Then, the cells were constant current-discharged at 1 A for 10 seconds and constant current-discharge at 10 A for 4 seconds.

The DC-internal resistance (DC-IR) of the cells was calculated using the formula $\Delta R=\Delta V/\Delta I$ from data between 18 seconds and 23 seconds.

Referring to Table 1, Example 1 exhibited smaller DC-internal resistance after the cycle repetition compared with Comparative Example 1.

Evaluation of Long-Term Placement Characteristics

Figure 2:
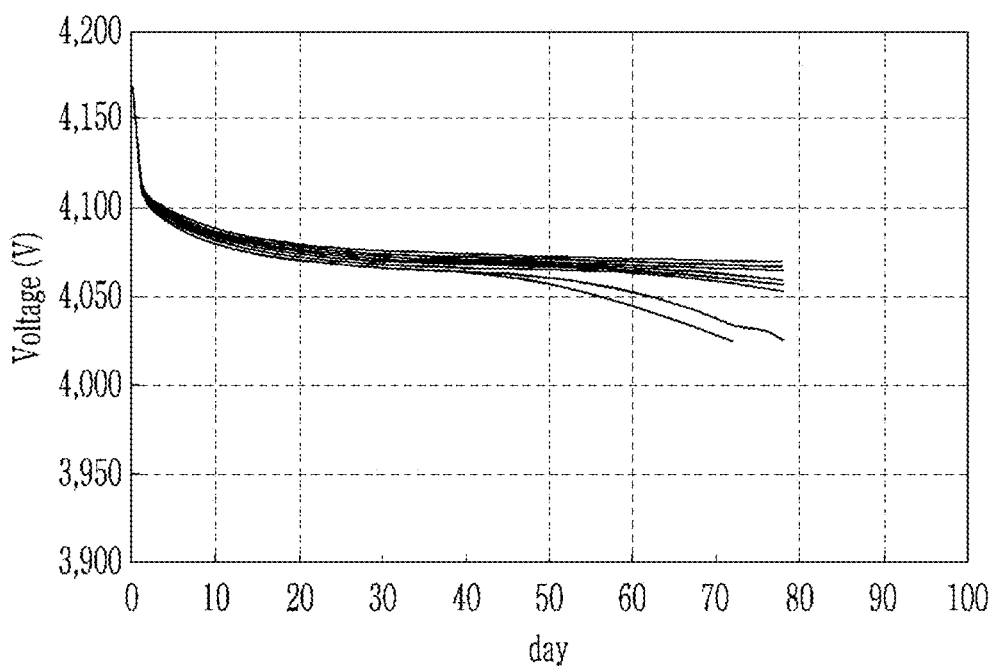
FIG. 2 is a graph showing a change in open circuit voltage (OCV) over 100 days when the battery cell according to Comparative Example 1 was stored at 100% SOC after formation charge/discharge.
Figure 3:
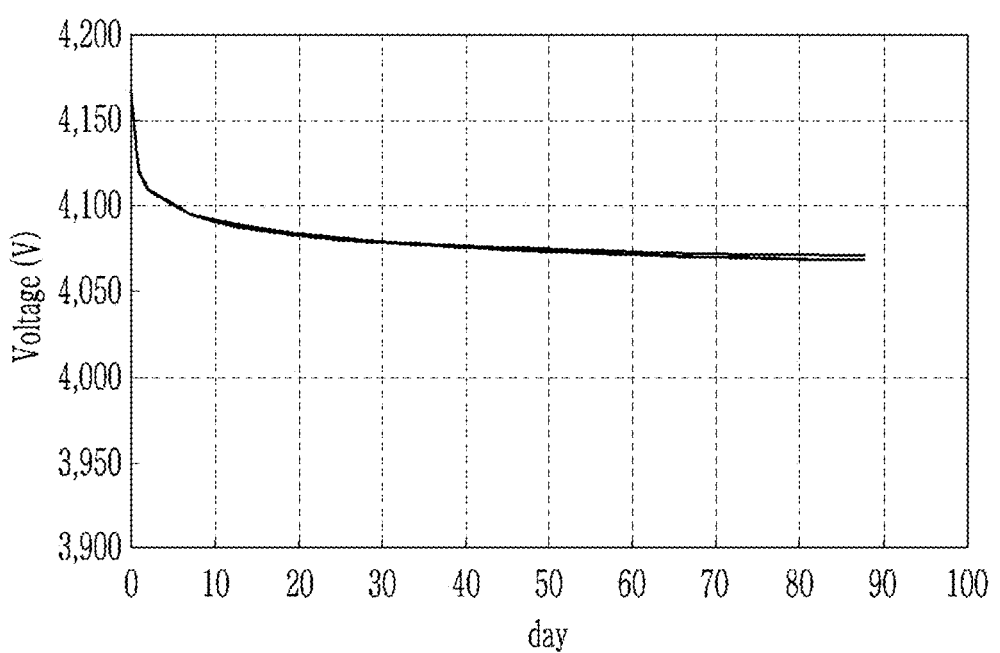
FIG. 3 is a graph showing a change in OCV over 100 days when the battery cell according to Example 1 was stored at 100% SOC after formation charge/discharge.

After twice performing a formation charge/discharge at current density of at 0.2 C/0.5 C and once performing a standard charge/discharge at current density of 0.5 C/0.2 C under a charge cut-off voltage of 4.2 V (Li/graphite) and a discharge cut-off voltage of 2.6 V (Li/graphite), the cells of Comparative Example 1 and Example 1 while allowed to stand for 100 days at 100% state of charge (SOC) were measured, and the resulting voltage drops over time are shown in Table 1 and FIGS. 2 and 3.

FIGS. 2 and 3 are graphs showing voltage changes in OCV (Open Circuit Voltage) states when the battery cells according to Comparative Example 1 and Example 1, respectively, were stored for 100 days at 100% SOC after formation charge/discharge.

Referring to FIG. 2, some of the cell samples according to Comparative Example 1 exhibited voltage drops after 40 days.

In comparison, referring to FIG. 3, the cell samples according to Example 1 did not exhibit voltage drops.

In addition, referring to Table 1, Comparative Example 1 exhibited a defect rate of 0.6%, while Example 1 exhibited a defect rate of 0.18%, which is relatively low.

Accordingly, the cell having the passivation film according to Example 1 exhibited excellent long-term placement characteristics.

Evaluation of Storage Characteristics at High Temperature

Each rechargeable lithium battery cell according to Example 1 and Comparative Example 1 was allowed to stand at 60° C. for 30 days at 100% SOC. The rate of resistance increase over that storage time was evaluated, and the results are shown in Table 1.

The resistance increase rate (%) is a percentage of DC-IR after allowed to stand for 30 days relative to initial DC-IR.

Referring to Table 1, Example 1 exhibited a smaller DC-internal resistance increase rate when allowed to stand at 60° C. for 30 days compared with Comparative Example 1.

TABLE 1

|  | Voltage drop characteristics (defect rate %) | DC-IR after cycle repetition | DC-IR increase rate at high-temperature storage |
|---|---|---|---|
| Comparative Example 1 | 0.6% | 26.1 mohm | 35% |
| Example 1 | 0.18% | 25.4 mohm | 27% |

Accordingly, the cell of Example 1 exhibited improved oxidation resistance and decreased cell resistance according to charges/discharges and at a high temperature.

Linear Sweep Voltammetry (LSV) Evaluation of Battery Cell

Figure 4:
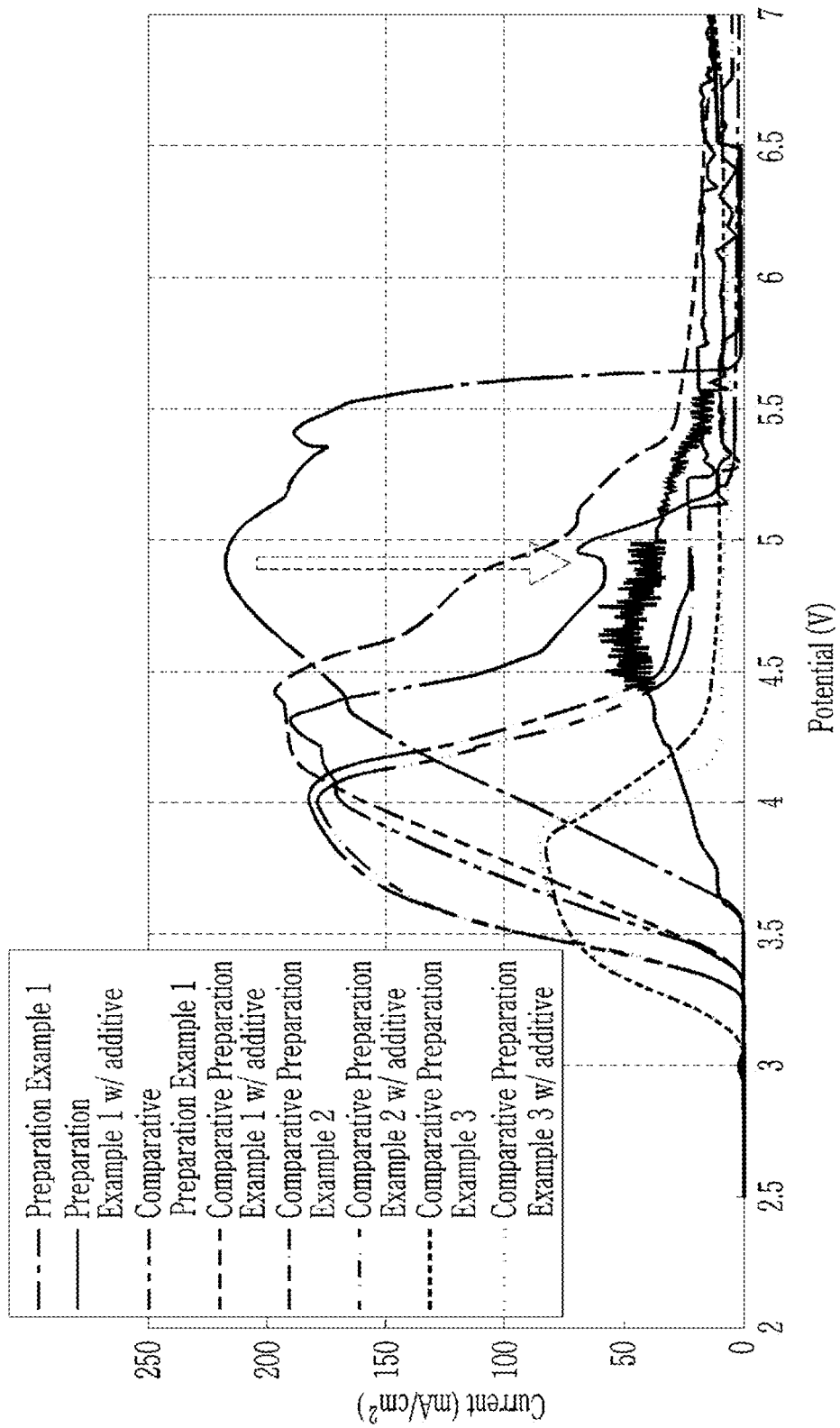
FIG. 4 shows a linear sweep voltammetry (LSV) evaluation result for the triode cells according to Preparation Example 1 and Comparative Preparation Examples 1-4.

Triode (three-electrode) cells were manufactured using various metal working electrodes, and linear sweep voltammetry (LSV) at 25° C. was used to evaluate oxidative decomposition of each electrode, the results of which are shown in FIG. 4. The electrolyte used in the triode cells was the same as in Example 1, e.g., 1.5M LiPF$_6$ dissolved in EC/EMC/DMC=volume ratio of 2:2:6. with 1 wt % of the compound represented by Chemical Formula 3-1 as an additive:

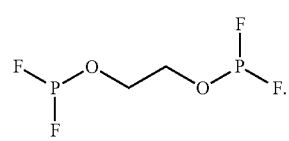

Chemical Formula 3-1

(Preparation Example 1) negative electrode metal: Cu
(Comparative Preparation Example 1) negative electrode metal: Ni
(Comparative Preparation Example 2) negative electrode metal: Fe
(Comparative Preparation Example 3) Negative Electrode Metal: Zn The triode electrochemical cells manufactured using each negative electrode metal as a working electrode and a Li metal as a reference electrode and a counter electrode were used in the LSV experiments. Each scan was performed within a range of 2.5 V to 7.0 V at a scan rate of 1 mV/sec.

FIG. 4 shows a LSV evaluation result for the triode cells according to Preparation Example 1 and Comparative Preparation Examples 1-4.

Figure 5:
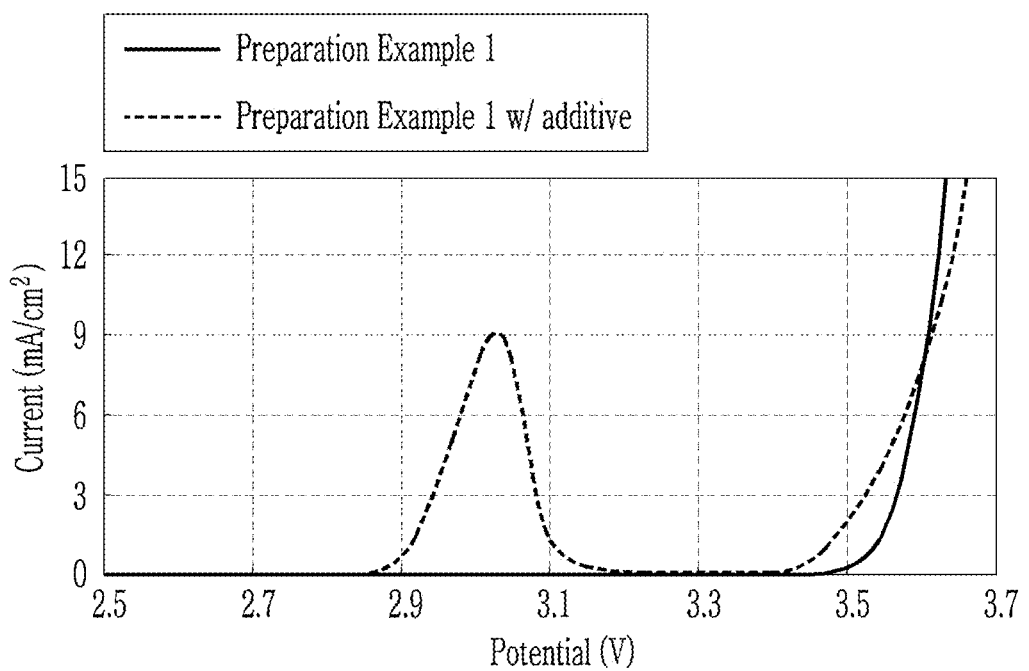
FIG. 5 is an enlarged portion of FIG. 4 showing a reduction peak in the LSV evaluation result.

FIG. 5 is an enlarged portion of FIG. 4 showing a reduction peak of the LSV evaluation result.

Figure 6:
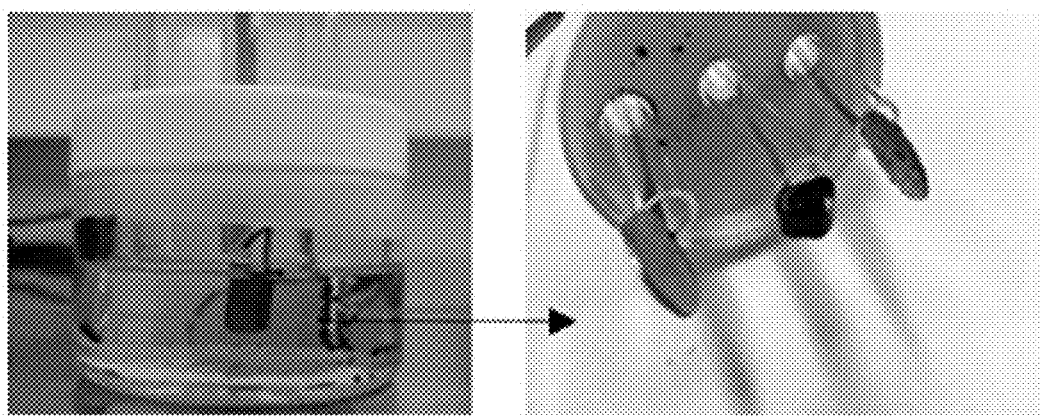
FIG. 6 is a photograph assessing formation of a passivation film after LSV evaluation on the electrode of the triode cell according to Comparative Preparation Example 1.

FIG. 6 is a photograph assessing formation of a passivation film after LSV evaluation on the electrode of the triode cell according to Comparative Preparation Example 1.

Figure 7:
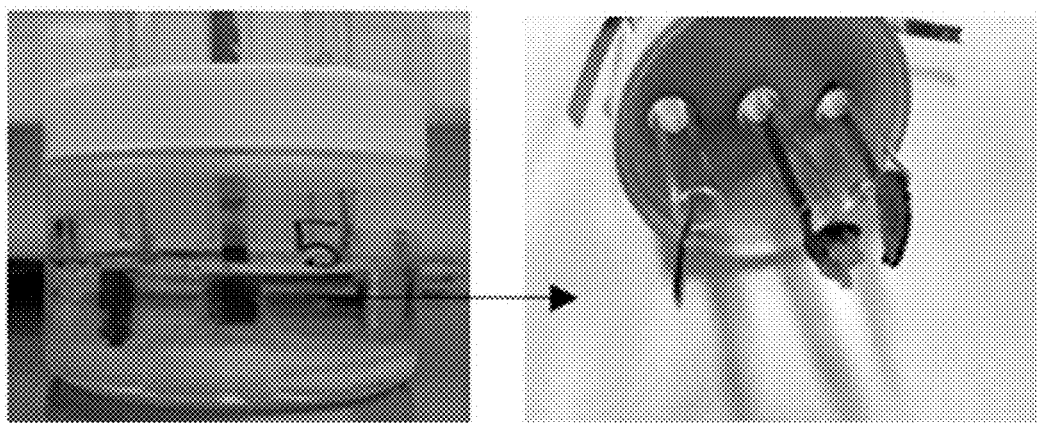
FIG. 7 is a photograph assessing formation of a passivation film after LSV evaluation on the electrode of the triode cell according to Preparation Example 1 according to an embodiment of the present disclosure.

FIG. 7 is a photograph assessing formation of a passivation film after LSV evaluation on the electrode of the triode cell according to Preparation Example 1 according to an embodiment of the present disclosure.

Referring to FIG. 5, the triode cell using the Cu negative electrode according to Preparation Example 1 showed a reduction peak within a range of 2.5 to 3.5 V in an electrolyte including an additive according to embodiments of the present disclosure. This result shows that a passivation film was formed during the initial charge/discharge to effectively suppress an oxidation reaction of the electrode and the electrolyte, as shown in FIG. 4, and accordingly, an excellent effect of suppressing or reducing metal elution from the electrode would be expected.

In addition, as seen in FIG. 6, the passivation films were not formed on the electrodes according to Comparative Preparation Examples, but as seen in FIG. 7, the passivation film was formed on the electrode according to Preparation Example 1.

Formation of Passivation Film and Component Evaluation

Oxidative decomposition at the working electrode of the triode cells used for the LSV evaluation was performed in the electrolyte according to Example 3 to examine whether a passivation film was formed or not.

Figure 8:
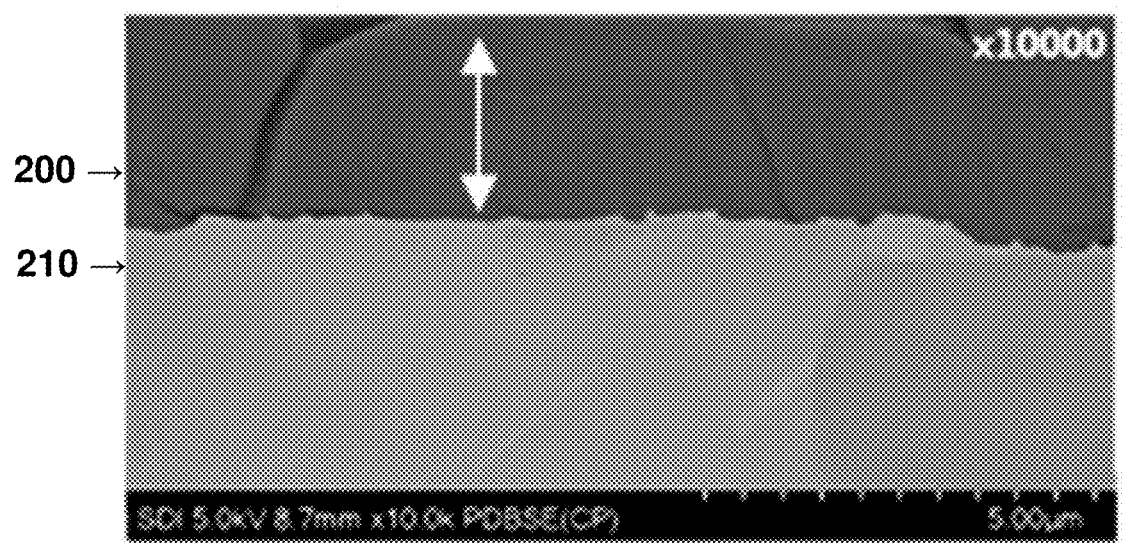
FIG. 8 is a scanning electron microscope (SEM) photograph showing a cross-section of the electrode tab according to Example 3.

FIG. 8 is a scanning electron microscope (SEM) photograph showing a cross-section of the electrode tab according to Example 3. These SEM results for the electrode tab are representative of SEM results of other portions of the current collector, and similar results were observed for other metal-containing portions (directly exposed to electrolyte) of the current collector in the electrode, as would be expected and understood by those having ordinary skill in the art.

Figure 9:
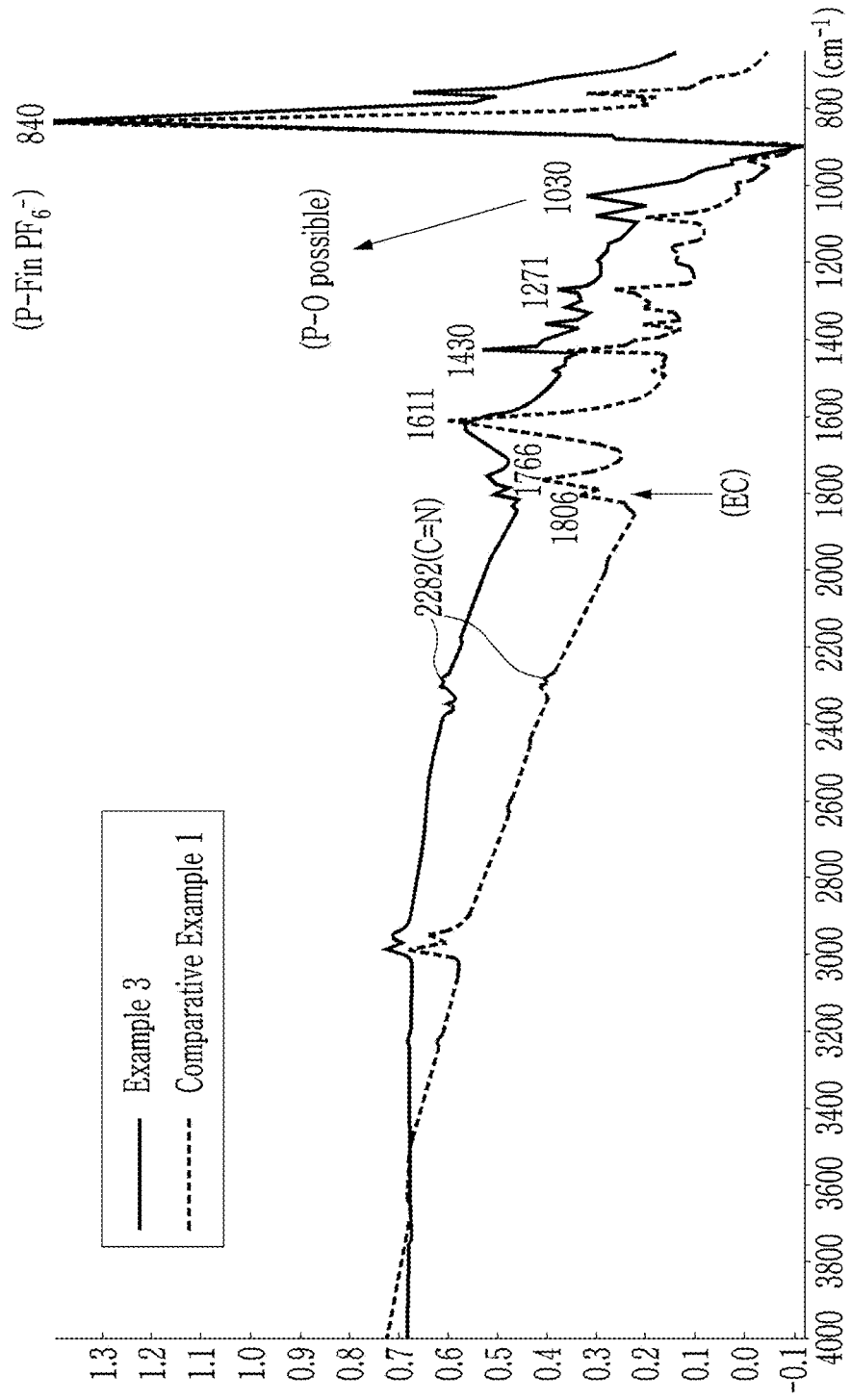
FIG. 9 is an infrared (IR) spectrum analyzing the composition of the passivation film components according to Example 3.

FIG. 9 is an infrared (IR) spectrum analyzing the composition of the passivation film components according to Example 3.

Referring to FIG. 8, a passivation film 200 was formed on the cross section of an electrode tab 210 including a copper component, and as shown by the peak assignments in the IR spectrum of FIG. 9, a component represented by Chemical Formula 1 was included in the passivation film 200.

As used herein, the terms "use", "using", and "used" may be considered synonymous with the terms "utilize", "utilizing", and "utilized", respectively. Further, the use of "may" when describing embodiments of the present disclosure refers to "one or more embodiments of the present disclosure".

As used herein, the terms "substantially", "about", and similar terms are used as terms of approximation and not as terms of degree, and are intended to account for the inherent deviations in measured or calculated values that would be recognized by those of ordinary skill in the art.

Also, any numerical range recited herein is intended to include all subranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

Hereinbefore, certain embodiments of the present disclosure have been described and illustrated, however, it will be apparent to those having ordinary skill in the art that the present disclosure is not limited to the embodiments as described, and may be variously modified and transformed without departing from the spirit and scope of the present disclosure, as defined by the following claims and equivalents thereof.

DESCRIPTION OF SOME OF THE SYMBOLS

100: rechargeable lithium battery
112: negative electrode
113: separator
114: positive electrode
120: battery case
140: sealing member
200: passivation film
210: electrode tab

What is claimed is:

1. A rechargeable lithium battery comprising:
   a positive electrode;
   a negative electrode; and
   an electrolyte with the positive electrode and the negative electrode and comprising a lithium salt,
   wherein at least one electrode selected from the positive electrode and the negative electrode comprises:
   a current collector;
   an electrode tab extending from the current collector;
   an active material layer on the current collector; and
   a passivation film including a material represented by Chemical Formula 1 and formed on at least one selected from the current collector and the electrode tab:

$$CuX(POF_2)_n Y_2 Z, \qquad \text{Chemical Formula 1}$$

wherein, in Chemical Formula 1,
   X is a $C_1$ to $C_{10}$ alkylene group,
   Y is represented by Chemical Formula 2:

$$NC-R^1-CN, \text{ wherein, } R^1 \text{ is a } C_1 \text{ to } C_{10} \text{ alkylene group,} \qquad \text{Chemical Formula 2}$$

Z is an anion group of the lithium salt, and
   n is 1 or 2.

2. The rechargeable lithium battery of claim 1, wherein the lithium salt comprises $LiPF_6$; $LiSbF_6$; $LiAsF_6$; $LiN(SO_2C_2F_5)_2$; $Li(CF_3SO_2)_2N$; $LiN(SO_3C_2F_5)_2$; $LiC_4F_9SO_3$; $LiClO_4$; $LiAlO_2$; $LiAlCl_4$; $LiN(C_xF_{2x+1}SO_2)(C_yF_{2y+1}SO_2)$, wherein x and y are each independently an integer from 1 to 20; LiCl; LiI; $LiB(C_2O_4)_2$; or a combination thereof.

3. The rechargeable lithium battery of claim 1, wherein Z is $PF_6^-$.

4. The rechargeable lithium battery of claim 1, wherein the current collector and the electrode tab comprise copper (Cu) metal.

5. The rechargeable lithium battery of claim 1, wherein the electrolyte comprises an additive.

6. The rechargeable lithium battery of claim 5, wherein the additive comprises a compound represented by Chemical Formula 3 and/or Chemical Formula 3

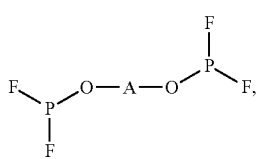

wherein, in Chemical Formula 3,
A is a $C_1$ to $C_{10}$ alkylene group, or $(-C_2H_4-O-C_2H_4-)_m$, wherein, m is an integer of 1 to 10, Chemical Formula 4

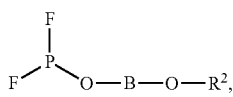

wherein, in Chemical Formula 4,
B is a $C_1$ to $C_{10}$ alkylene group, or $(-C_2H_4-O-C_2H_4-)_l$, wherein, l is an integer of 1 to 10, and
$R^2$ is a $C_1$ to $C_{10}$ alkyl group.

7. The rechargeable lithium battery of claim 5, wherein the additive comprises a compound represented by Chemical Formula 3-1 or Chemical Formula 4-1:

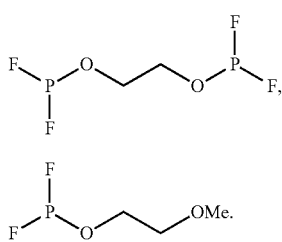

Chemical Formula 3-1

Chemical Formula 4-1

8. The rechargeable lithium battery of claim 5, wherein the additive comprises a nitrile-based compound.

9. The rechargeable lithium battery of claim 8, wherein the nitrile-based compound comprises succinonitrile, adiponitrile, glutaronitrile, a tri-cyanide compound, or a combination thereof.

10. The rechargeable lithium battery of claim 5, wherein the additive is included in an amount of about 0.1 wt % to about 10 wt % based on a total weight of the electrolyte.

11. The rechargeable lithium battery of claim 1, wherein the passivation film has a thickness of about 25 μm to about 50 μm.

12. A method of manufacturing the rechargeable lithium battery of claim 1, the method comprising:
putting an electrode assembly comprising the positive electrode and the negative electrode, and the electrolyte comprising the lithium salt into a battery case,
sealing the battery case to manufacture a battery cell, and
initially charging the battery cell at about 0.05 C to about 0.2 C for about 5 hours to about 10 hours, thereby forming the passivation film on a tab of the at least one electrode and/or its corresponding current collector.

13. A method of manufacturing a rechargeable lithium battery, the method comprising:
putting an electrode assembly comprising a positive electrode comprising a positive current collector, a positive electrode tab extending from the positive current collector, and a positive active material layer on the positive current collector; and a negative electrode comprising a negative current collector, a negative electrode tab extending from the negative current collector, and a negative active material layer on the negative current collector, and an electrolyte comprising a lithium salt into a battery case to manufacture a battery cell, and
initially charging the battery cell at about 0.05 C to about 0.2 C for about 5 hours to about 10 hours, thereby forming a passivation film comprising a material represented by Chemical Formula 1 on at least one selected from the positive current collector, the negative current collector, the positive electrode tab, and the negative electrode tab:

$CuX(POF_2)_nY_2Z$,  Chemical Formula 1 wherein, in Chemical Formula 1,
X is a $C_1$ to $C_{10}$ alkylene group,
Y is represented by Chemical Formula 2, $NC-R^1-CN$, wherein, $R^1$ is a $C_1$ to $C_{10}$ alkylene group,  Chemical Formula 2

Z is an anion group of the lithium salt, and
n is 1 or 2.

* * * * *